(12) United States Patent
Tsutsumi et al.

(10) Patent No.: US 8,362,633 B2
(45) Date of Patent: Jan. 29, 2013

(54) WIND TURBINE GENERATOR WITH A CONTROL UNIT FOR CONTROLLING A ROTATION SPEED OF A MAIN SHAFT

(75) Inventors: Kazuhisa Tsutsumi, Tokyo (JP); Masayuki Shimizu, Tokyo (JP); Daniil Dumnov, Midlothian (GB)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/997,912

(22) PCT Filed: Nov. 30, 2010

(86) PCT No.: PCT/JP2010/006978
§ 371 (c)(1),
(2), (4) Date: Feb. 15, 2011

(87) PCT Pub. No.: WO2012/073278
PCT Pub. Date: Jun. 7, 2012

(65) Prior Publication Data
US 2012/0061958 A1    Mar. 15, 2012

(51) Int. Cl.
*F03D 9/00* (2006.01)
(52) U.S. Cl. ............................. 290/44; 290/55
(58) Field of Classification Search ............ 290/44, 290/55, 43, 54; 60/396
See application file for complete search history.

(56) References Cited

U.S. PATENT DOCUMENTS

| | | |
|---|---|---|
| 4,280,061 A | 7/1981 | Lawson-Tancred |
| 5,190,446 A | 3/1993 | Salter et al. |
| 5,259,738 A | 11/1993 | Salter et al. |
| 7,436,086 B2 | 10/2008 | McClintic |
| 2010/0032959 A1 | 2/2010 | Nies |
| 2010/0040470 A1 | 2/2010 | Nies et al. |
| 2010/0133817 A1 | 6/2010 | Kinzie et al. |
| 2011/0057446 A1* | 3/2011 | Mayor Lusarreta et al. ... 290/44 |
| 2011/0140431 A1* | 6/2011 | Landa et al. ................. 290/44 |
| 2011/0142596 A1* | 6/2011 | Nies ............................ 415/13 |

FOREIGN PATENT DOCUMENTS

| | | |
|---|---|---|
| EP | 2154368 A2 | 2/2010 |
| GB | 1003003.9 | 2/2010 |

(Continued)

OTHER PUBLICATIONS

Rampen, W. H.S. et al., "Progress on the Development of the Wedding-Cake Digital Hydraulic Pump/Motor", 2nd European Wave Power Conference, Lisbon, Nov. 8-10, 1995, pp. 289-296.

(Continued)

*Primary Examiner* — Tho D Ta
(74) *Attorney, Agent, or Firm* — Kanesaka, Berner & Partners, LLP

(57) ABSTRACT

A wind turbine generator includes a hydraulic pump rotatable by a main shaft, a hydraulic motor connected to a generator, and a high pressure oil line and a low pressure oil line which are arranged between a hydraulic pump and a hydraulic motor. An operation mode selection unit switches an operation mode between a normal operation mode and a low rotation speed operation mode depending on environment conditions. The low rotation speed operation mode has a rated rotation speed of the main shaft lower than that of the normal operation mode, at least one of a rated displacement of the hydraulic pump and a rated pressure of the high pressure oil line that are greater than that of the normal operation mode and a rated output of a generator substantially same as that of the normal operation mode.

20 Claims, 7 Drawing Sheets

FOREIGN PATENT DOCUMENTS

| | | |
|---|---|---|
| GB | 1009013.2 | 5/2010 |
| GB | 1013773.5 | 8/2010 |
| WO | 2007053036 A1 | 5/2007 |
| WO | 2008113699 A2 | 9/2008 |

OTHER PUBLICATIONS

Salter, S. H., "Proposal for a Large, Vertical-Axis Tidal-Stream Generator with Ring-Cam Hydraulics", Department of Mechanical Engineering, Mayfield Road, University of Edinburgh EH9 3JL, Scotland, Third European Wave Energy Conference, Sep. 30-Oct. 2, 1998, Patras Greece.

Rampen, W. H.S., et al., "Gearless Transmissions for Large Wind-Turbines—The History and Future of Hydraulic Drives", Dewek Bremen, Dec. 2006, pp. 1-9.

International Search Report for PCT/JP2010/006978, dated Dec. 30, 2011.

Korean Office Action dated Sep. 28, 2012, issued to corresponding Korean Patent Application No. 2011-7009936.

* cited by examiner

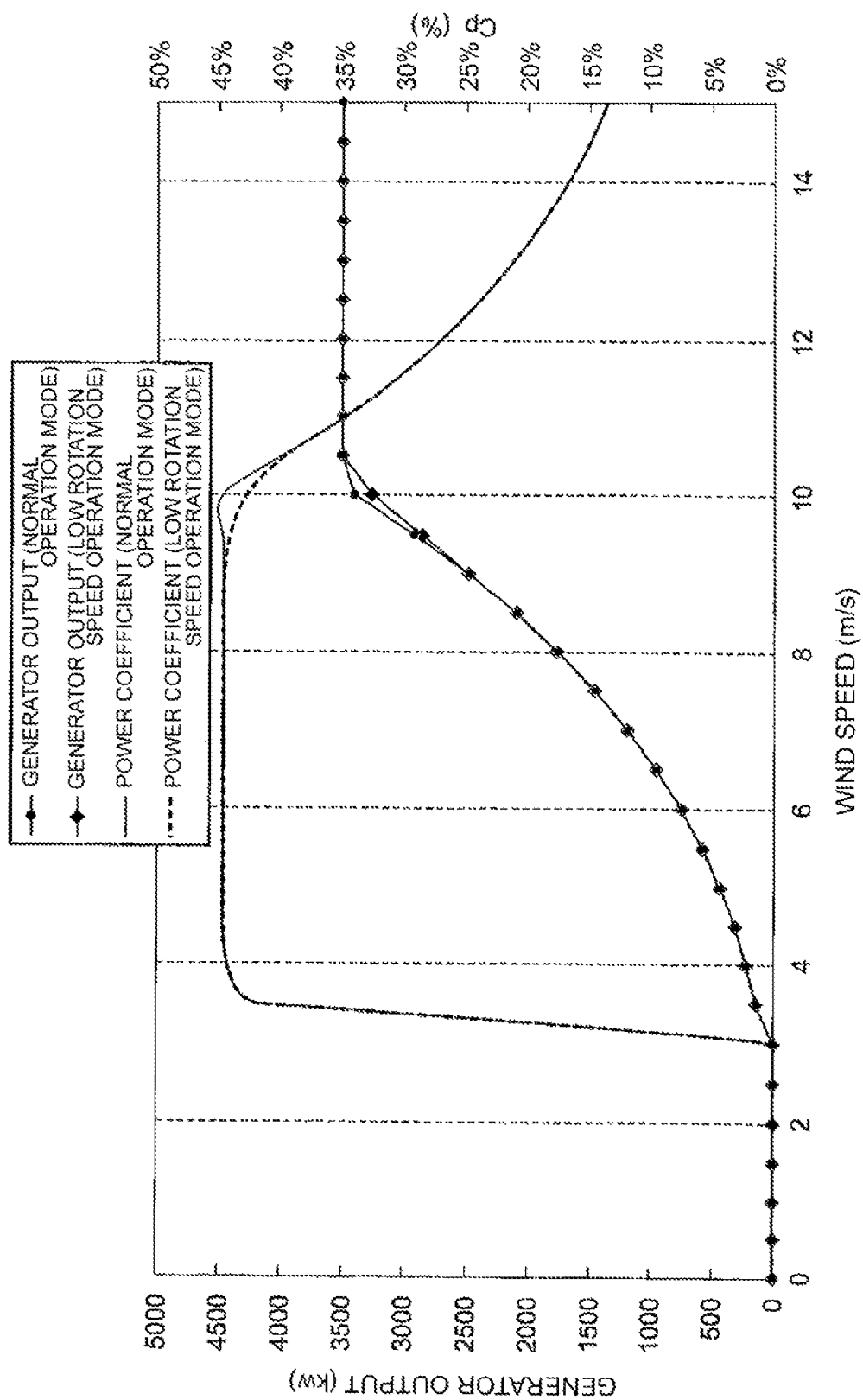

WIND TURBINE GENERATOR WITH A CONTROL UNIT FOR CONTROLLING A ROTATION SPEED OF A MAIN SHAFT

RELATED APPLICATIONS

The present application is based on and claims priority from International Application Number PCT/JP2010/006978, filed Nov. 30, 2010, the disclosures of which is hereby incorporated by reference herein in its entirety.

TECHNICAL FIELD

The present invention relates a wind turbine generator which transmits a rotation of a rotor to a generator via a fluid transmission having a combination of a hydraulic pump and a hydraulic motor and an operation method of the wind turbine generator.

BACKGROUND ART

In recent years, from a perspective of preserving the environment, it is becoming popular to use a wind turbine generator utilizing wind power which is one form of renewable energy.

The wind turbine generator converts motion energy of the wind to the rotation energy of the rotor and further converts the rotation energy of the rotor to electric power by the generator. In a common wind turbine generator, the rotation speed of the rotor is about a few rotations per minute to tens of rotations per minute. Meanwhile, a rated speed of the generator is normally 1500 rpm or 1800 rpm and thus a mechanical gearbox is provided between the rotor and the generator. Specifically, the rotation speed of the rotor is increased to the rated speed of the generator by the gear box and then inputted to the generator. The term "rated" means the intended maximum operating condition and may be applied to speed, pressure, flow, displacement or power for example. The rated condition may be exceeded for short periods in use, generally not more than a few minutes and only intermittently.

In recent years, the gear box tends to become heavier and more expensive as the wind turbine generators are getting larger to improve power generation efficiency. Thus, a wind turbine generator equipped with a hydraulic transmission adopting a combination of a hydraulic pump and a hydraulic motor of a variable capacity type is getting much attention.

For instance, Patent Document 1 discloses a wind turbine generator using a hydraulic transmission including a hydraulic pump rotated by a rotor and a hydraulic motor connected to a generator. In the hydraulic transmission of this wind turbine generator, the hydraulic pump and the hydraulic motor are connected via a high pressure reservoir and a low pressure reservoir. By this, the rotation energy of the rotor is transmitted to the generator via the hydraulic transmission. Further, the hydraulic pump is constituted of a plurality of sets of pistons and cylinders, and cams which periodically reciprocate the pistons in the cylinders.

Further, Patent Document 2 describes a wind turbine generator adopting a hydraulic transmission constituted of a hydraulic pump rotated by a rotor, a hydraulic motor connected to a generator, and an operating oil path arranged between the hydraulic pump and the hydraulic motor. In the hydraulic transmission of this wind turbine generator, the hydraulic pump is constituted of a plurality of sets of pistons and cylinders, cams which periodically reciprocate the pistons in the cylinders, and high pressure valves and low pressure valves which opens and closes with the reciprocation of the pistons. By latching the piston near a top dead center, a working chamber surrounded by the cylinder and the piston is disabled, and then the displacement of the hydraulic pump is changed.

Although the hydraulic pump and the hydraulic motor are not variable displacement type, Patent Document 3 discloses a wind turbine generator having a hydraulic pump and a hydraulic motor. The wind turbine generator of Patent Document 3 maintains the rotation speed of the generator constant by adjusting the pressure of operating oil to be supplied from a hydraulic pump to a hydraulic motor. In this wind turbine generator, a discharge side of the hydraulic pump is connected to an intake side of the hydraulic motor via an inner space of the tower functioning as a high pressure tank, and an intake side of the hydraulic pump is connected to a discharge side of the hydraulic motor via a low pressure tank arranged below the tower.

CITATION LIST

Patent Literature

[PTL 1]
US 2010/0032959
[PTL 2]
US 2010/0040470
[PTL 3]
U.S. Pat. No. 7,436,086 B

SUMMARY OF INVENTION

Technical Problem

There is a trend to make a larger wind turbine generator to improve the power generation efficiency. However, in the larger wind turbine generator a tip circumferential speed of the blade also becomes faster. This bears issues such as noise (wind noise of the blade), bird strikes (wild birds colliding against the blade). And the higher rotation speed causes an issue of temperature rising due to friction heat of a bearing shaft. However, none of Patent Documents 1, 2 and 3 discloses how to take measures against the issues such as the noise, the bird strike and the friction heat of the shaft bearing.

In view of the issues above, an object of the present invention is to provide a wind turbine generator and an operation control method thereof, which takes measures against issues such as noise, bird strike and a friction heat of a bearing shaft.

Solution to Problem

The present invention proposes a wind turbine generator comprising: a hub; a main shaft coupled to the hub; a generator which converts rotation energy transmitted from the main shaft to electric power; a hydraulic pump of variable displacement type which is rotated by the main shaft; a hydraulic motor of variable displacement type which is connected to the generator; a high pressure oil line which is arranged between a discharge side of the hydraulic pump and an intake side of the hydraulic motor; a low pressure oil line which is arranged between an intake side of the hydraulic pump and a discharge side of the hydraulic motor; a control unit which has a pump controller and a motor controller, the pump controller adjusting a displacement $D_p$ of the hydraulic pump, the motor controller adjusting a displacement $D_m$ of the hydraulic motor; and an operation mode selection unit which switches an operation mode between a normal operation mode and a low rotation speed operation mode, the low rotation speed operation mode having a rated rotation speed of the main shaft lower than that of the normal operation mode.

In the wind turbine generator, the operation mode selection unit selects the normal operation mode or the low rotation speed operation mode with lower rated rotation speed of the main shaft. The low rotation speed operation mode can be selected when there is a need to take measures against issues such as the noise, bird strikes, the friction heat of the shaft bearing.

In the above wind turbine generator, at least one of a rated displacement of the hydraulic pump and a rated pressure of the high pressure oil line may be greater in the low rotation speed operation mode than that of the normal operation mode. Further, the rated output of electric power in the low rotation speed operation mode may be substantially the same as that of the normal operation mode. Furthermore, the operation mode selection unit may select the normal operation mode or the low rotation speed operation mode depending on environment conditions.

As described above, by using the low rotation speed operation mode in which at least one of the rated displacement of the hydraulic pump and the rated pressure of the high pressure oil line is greater than that of the normal operation mode, and the rated output of electric power is substantially the same as that of the normal operation mode, although the low rotation speed operation mode has a rated rotation speed of the main shaft lower than that of the normal operation mode, it is possible to obtain a rated output of the generator substantially same as that of the normal operation mode. Therefore, by adopting the low rotation speed operation mode, the rated rotation speed of the main shaft can be reduced without experiencing the lower rated output of the generator.

Herein, "environmental conditions" means temporal/geographical conditions surrounding the wind turbine generator, which affect the need to take measures against the noise, the bird strike and the friction heat of the shaft bearing. For example, the environmental conditions include whether or not it is at a certain time such as the nighttime with noise regulations, whether or not the wind turbine generator is installed on a flyway of migrant birds and whether or not a temperature of a shaft bearing for supporting the main shaft is within an acceptable range.

In the above wind turbine generator, it is preferable that, for both of the normal operation mode and the low rotation speed operation mode, the pump controller obtains a target torque of the hydraulic pump at which a power coefficient becomes maximum when the rotation speed of the main shaft is not more than the rated rotation speed, and then sets a displacement $D_p$ of the hydraulic pump based on the target torque and a hydraulic pressure of operating oil in the high pressure oil line.

As described above, for both of the normal operation mode and the low rotation speed operation mode, the pump controller obtains the target torque of the hydraulic pump at which a power coefficient becomes maximum when the rotation speed of the main shaft is not more than the rated rotation speed, and then sets a displacement $D_p$ of the hydraulic pump based on the target torque and a hydraulic pressure of operating oil in the high pressure oil line. By controlling the hydraulic pump in this manner, the power generation efficiency can be improved.

In that case, the wind turbine generator may further comprise a rotation speed sensor which measures a rotation speed of the main shaft, wherein the pump controller obtains the target torque at which a power coefficient becomes maximum in accordance with the rotation speed of the main shaft measured by the rotation speed sensor.

Alternatively, the wind turbine generator may further comprise an anemometer which measures a wind speed, wherein the pump controller obtains from the measured wind speed the target torque at which a power coefficient becomes maximum.

Further, in the wind turbine generator, it is also preferable that the motor controller sets a displacement $D_m$ of the hydraulic motor based on a discharge amount $Q_p$ of the hydraulic pump so that a rotation speed of the generator becomes constant, the discharge amount $Q_p$ of the hydraulic pump being obtained from the displacement $D_p$.

As described above, the rotation speed of the generator can be kept constant even when the target torque of the hydraulic pump changes. Thus, the electric power having constant frequency can be produced in the generator 20.

In this case, it is also preferable that each of the hydraulic pump and the hydraulic motor includes a plurality of oil chambers each of which is surrounded by a cylinder and a piston moving slidingly in the cylinder, a cam having a cam profile which is in engagement with the piston, high pressure valves each of which opens and closes a communication path between each of the oil chambers and the high pressure oil line, and low pressure valves each of which opens and closes a communication path between each of the oil chambers and the low pressure oil line, and that the pump controller adjusts the displacement $D_p$ of the hydraulic pump by a ratio of disabled oil chambers to all of the oil chambers of the hydraulic pump, the disabled oil chambers being kept such that during a cycle of the piston of the hydraulic pump starting from a bottom dead center, reaching a top dead center and returning to the bottom dead center, the high pressure valve of the hydraulic pump is closed and the low pressure valve remains open, and that the motor controller adjusts the displacement $D_m$ of the hydraulic motor by a ratio of disabled oil chambers to all of the oil chambers of the hydraulic motor so as to adjust, the disabled oil chambers being kept such that during a cycle of the piston of the hydraulic pump starting from a bottom dead center, reaching a top dead center and returning to the bottom dead center, the high pressure valve of the hydraulic pump is closed and the low pressure valve remains open.

The state of the oil chambers (working chamber or disabled chamber) of the hydraulic pump and the hydraulic motor can be switched every cycle in which the piston completes one set of upward and downward motions. Therefore, the displacements of the hydraulic pump and the hydraulic motor can be promptly changed by changing the ratio of disabled chambers to all of the oil chambers.

Further, it is preferable that the cam of the hydraulic pump is a ring cam which is disposed circumferentially around the main shaft and has a cam profile defining a plurality of waves with a plurality of concave portions and convex portions that are alternately disposed around the main shaft, and that the cam of the hydraulic motor is an eccentric cam.

In a typical wind turbine generator, the rotation speed of the rotor is about a few rotations per minute to tens of rotations per minute. On the other hand, a rated speed of the generator is normally 1500 rpm or 1800 rpm. In this case, in the hydraulic transmission having the hydraulic pump and the hydraulic motor, the rotation speed of the rotor needs to be increased approximately 100 times to be transmitted to the generator. Herein, the increasing speed ratio of the hydraulic transmission is decided by the ratio of the displacement Dp of the hydraulic pump to the displacement Dm of the hydraulic motor. This means that the displacement Dp of the hydraulic pump needs to be set approximately 100 times greater than the displacement Dm of the hydraulic motor. The displacement of Dp of the hydraulic pump can be increased by changing the capacity per cylinder or increasing the number of the cylinders. However, it is inevitable that the size of the hydraulic pump becomes larger.

Therefore, by using the ring cam of the hydraulic pump with a cam profile defining a plurality of waves with concave portions and convex portions that are alternately disposed around the main shaft, the ring cam moves each of the pistons upward and downward many times while the ring cam completes one rotation. By this, it is possible to increase the displacement Dp of the hydraulic pump without making the size of the hydraulic pump larger. As for the cam of the hydraulic motor, by using the eccentric cam that is disposed eccentrically with respect to a shaft center O of the output shaft of the hydraulic motor, the displacement Dm of the hydraulic motor becomes smaller than that of the hydraulic pump, thereby achieving the higher speed increasing ratio of the hydraulic transmission.

The above wind turbine generator may further comprise a pitch driving mechanism which adjusts a pitch angle of blades mounted on the hub, and the control unit may control the pitch driving mechanism so as to maintain rated output of the generator once the output of the generator reaches the rated output.

By this, the generator can generate a certain amount of output (rated output) of electric power in a rated operation wherein the power generation is carried out at a wind speed which is equal to or higher than the rated wind speed and lower than the cut-out wind speed.

Further, the rated wind speed means the wind speed required to obtain the rated output from the generator and the cut-out wind speed means the wind speed at which the power generation is stopped to secure security of the wind turbine generator. For instance, the rated wind speed may be set approximately 10 m/s and the cut-out wind speed may be set 25 m/s.

The present invention also proposes an operation method of a wind turbine generator which comprises a hub, a main shaft connected to the hub, a generator for converting a rotation energy transmitted from the main shaft to electric power, a hydraulic pump which is rotated by the main shaft, a hydraulic motor of variable displacement type connected to the generator, a high pressure oil line arranged between a discharge side of the hydraulic pump and an intake side of the hydraulic motor, a low pressure oil line arranged between an intake side of the hydraulic pump and a discharge side of the hydraulic motor, the method comprising: a mode selection step of selecting an operation mode between a normal operation mode and a low rotation speed operation mode, the low rotation speed operation mode having a rated rotation speed of the main shaft lower than that of the normal operation mode; and a displacement adjustment step of adjusting the displacements of the hydraulic pump and the hydraulic motor based on the operation mode selected in the mode selection step.

According to the operation control method of the wind turbine generator, the operation mode selection unit selects the normal operation mode or the low rotation speed operation mode with lower rated rotation speed of the main shaft. The low rotation speed operation mode can be selected to take measures against issues such as the noise, bird strikes, the friction heat of the shaft bearing.

According to the operation control method of the wind turbine generator, at least one of a rated displacement of the hydraulic pump and a rated pressure of the high pressure oil line may be greater in the low rotation speed operation mode than that of the normal operation mode. Further, according to the operation control method of the wind turbine generator, a rated output of electric power in the low rotation speed operation mode may be substantially the same as that of the normal operation mode. Furthermore, in the mode selection step, it is possible to select the normal operation mode or the low rotation speed operation mode depending on environment conditions.

Advantageous Effects of Invention

According to the present invention, it is possible to select the normal operation mode or the low rotation speed operation mode with lower rated rotation speed of the main shaft, depending on environment conditions. The low rotation speed operation mode can be selected when there is a need to take measures against issues such as the noise, bird strikes, the friction heat of the shaft bearing.

BRIEF DESCRIPTION OF DRAWINGS

FIG. 7 is a graph showing a result of comparing a normal operation mode and a low rotation speed operation mode in relation to a generator output and a power coefficient Cp.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

A general structure of the wind turbine generator in relation to a preferred embodiment is explained hereinafter. As an example of the wind turbine generator, a three-bladed wind turbine is used. However, the preferred embodiment is not limited to this example and can be applied to various types of wind turbines.

Figure 1:
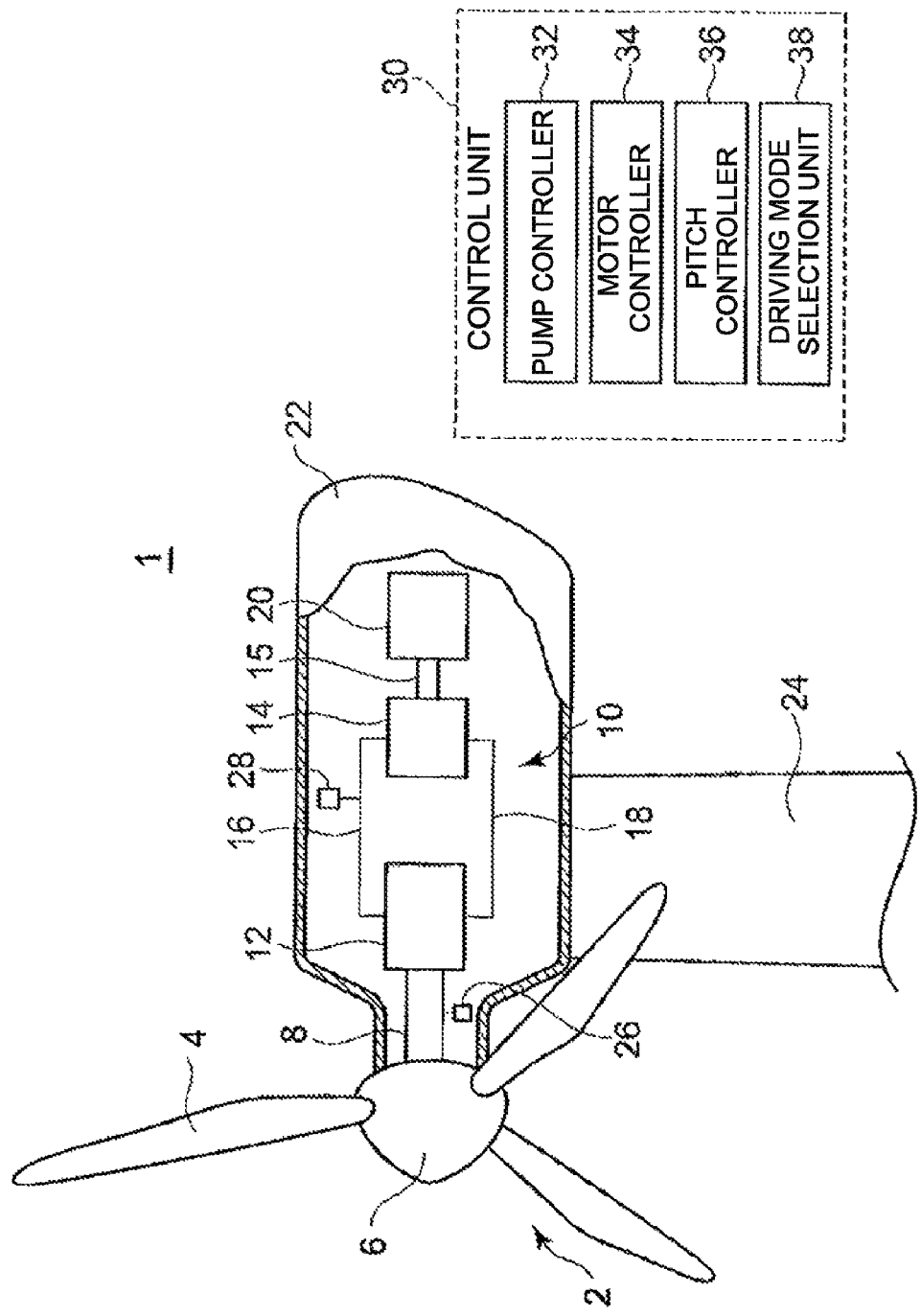
FIG. 1 is an illustration of an example structure of a wind turbine generator.

FIG. 1 is an illustration of an example structure of a wind turbine generator.

Figure 2:
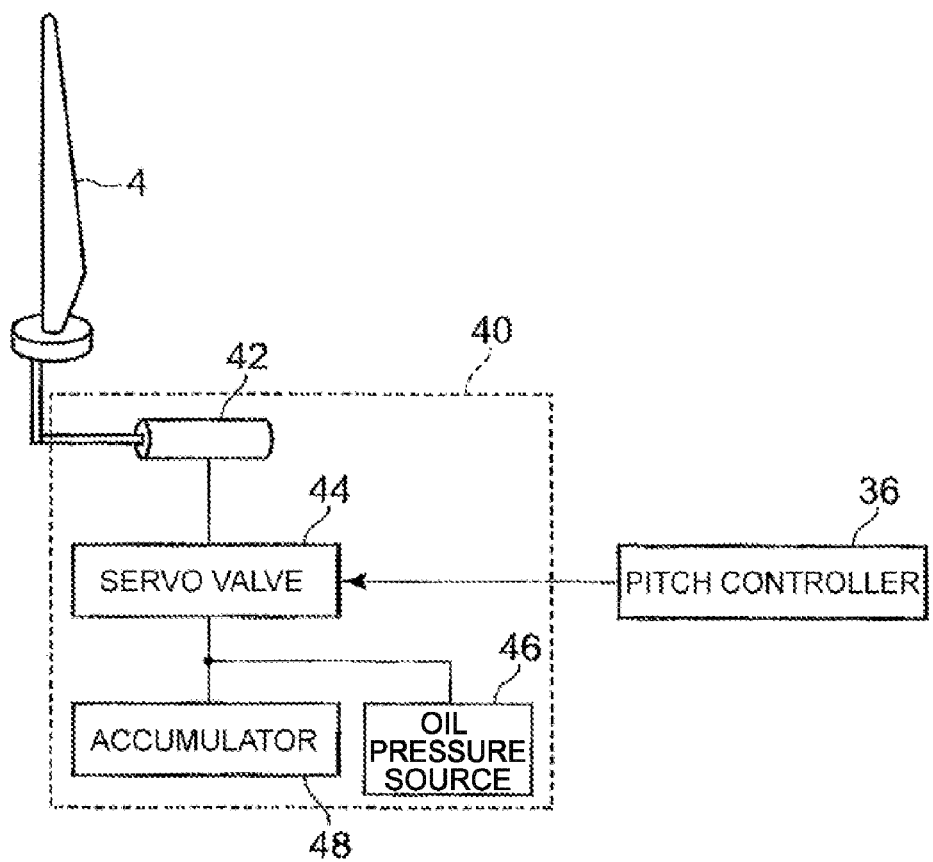
FIG. 2 is an illustration of a structure of a pitch driving mechanism.

FIG. 2 is an illustration of a structure of a pitch driving mechanism.

As illustrated in FIG. 1, a wind turbine generator 1 comprises a rotor 2 rotated by the wind, a hydraulic transmission 10 for increasing rotation speed of the rotor 2, a generator 20 for generating electric power, a nacelle 22, a tower 24 for supporting the nacelle 24 and a control unit 30 for controlling each unit of the wind turbine generator.

The rotor 2 is constructed such that a main shaft 8 is connected to a hub 6 having blades 4. Specifically, three blades 4 extend radially from the hub 6 and each of the blades 4 is mounted on the hub 6 connected to the main shaft 8. By this, the power of the wind acting on the blades 4 rotates the entire rotor 2, the rotation of the rotor 2 is inputted to the hydraulic transmission 10 via the main shaft 8. The rotation speed of the main shaft 8 is measured by a rotation speed meter 26 and used for the control by the control unit 30.

The hub 6 houses a pitch driving mechanism 40 as shown in FIG. 2. The pitch driving mechanism 40 is structured by a hydraulic cylinder 42, a servo valve 44, an oil pressure source 46 and an accumulator 48. Under the control of a pitch controller 36, the servo valve adjust the supply amount of high pressure oil generated by the oil pressure source 46 and high pressure oil stored in the accumulator 48 to the hydraulic cylinder 42 so that the pitch angle of the blade becomes a desired angle.

The hydraulic transmission 10 illustrated in FIG. 1 comprises a hydraulic pump 12 of a variable displacement type which is rotated by the main shaft 8, a hydraulic motor 14 of a variable displacement type which is connected to the generator 20, and a high pressure oil line 16 and a low pressure oil line 18 which are arranged between the hydraulic pump 12 and the hydraulic motor 14.

The high pressure oil line 16 connects a discharge side of the hydraulic pump 12 to a intake side of the hydraulic motor 14. The low pressure oil line 18 connects a intake side of the hydraulic pump 12 to a discharge side of the hydraulic motor 14. The operating oil (low pressure oil) discharged from the hydraulic pump flows into the hydraulic motor via the high pressure oil line. The operating oil having worked in the hydraulic motor 14 flows into the hydraulic pump 12 via the low pressure oil line 18 and then the pressure thereof is raised by the hydraulic pump 12 and finally the operating oil flows into the hydraulic motor 14. A detailed structure of the hydraulic pump 12 and the hydraulic motor 14 is described later.

Further, the pressure of the high pressure oil line 16 is measured by a pressure sensor 28 and used for the control by the control unit 30.

The generator 20 is connected to an output shaft 15 of the hydraulic motor 14 and generates electric power with use of the torque inputted from the hydraulic motor 14. The generator 20 is connected to the hydraulic motor 14 of the hydraulic transmission 10. An existing synchronous generator or an existing asynchronous generator can be used as the generator 20. The rotation speed of the generator 20 can be kept constant under the control of the control of the hydraulic transmission 10 in the wind turbine generator 1. Thus, with use of the synchronous generator as the generator 20, the electric power can be directly supplied from the synchronous generator 20 to the grid via a transformer (AC link method), and it does not require an expensive inverter to achieve a variable speed operation.

The nacelle 22 supports the hub of the rotor 2 rotatably and houses a variety of devices such as the hydraulic transmission 10 and the generator 20. The nacelle 22 is further supported on the tower 24 rotatably and may be turned in accordance with the wind direction by a yaw motor which is not shown.

The control unit 30 comprises a pump controller 32 for controlling the hydraulic pump 12, a motor controller 34 for controlling the hydraulic motor 14 and an operation mode selector 38 for selecting an operation mode of the wind turbine generator. One or more of the control unit 30 components 32-38 may be located in different locations either inside or outside of the nacelle 22, so that the control unit 30 may form a distributed control system.

The pump controller 32 obtains a target torque of the hydraulic pump 12 at which a power coefficient becomes maximum when the rotation speed of the main shaft 8 is not more than the rated rotation speed, and then sets a displacement $D_p$ of the hydraulic pump 12 based on the target torque and a hydraulic pressure of operating oil in the high pressure oil line 16. Meanwhile, the motor controller 34 sets a displacement $D_m$ of the hydraulic pump 14 based on a discharge amount Qp of the hydraulic pump obtained from the displacement Dp of the hydraulic pump 12 so that the rotation seed of the generator becomes constant.

The pitch controller 36 controls the servo valve 44 of the pitch driving mechanism 40 to maintain the rated output of the generator 20 once the output of the generator 20 reaches the rated output, and changes the pitch angle of the blade 4 to the feathering position. By this, the generator 20 can generate a certain amount of output (rated output) of electric power in a rated operation wherein the power generation is carried out at a wind speed which is equal to or higher than the rated wind speed and lower than the cut-out wind speed. Herein, the rated wind speed means the wind speed required to obtain the rated output from the generator 20 and the cut-out wind speed means the wind speed at which the power generation is stopped to secure security of the wind turbine generator 1. For instance, the rated wind speed may be set approximately 10 m/s and the cut-out wind speed may be set 25 m/s.

The operation mode selection unit 38 selects one of a normal operation mode and a low rotation speed operation mode depending on environmental conditions. The low rotation speed operation mode has a rated rotation speed of the main shaft 8 lower than that of the normal operation mode and a rated displacement of the hydraulic pump 12 greater than that of the normal operation mode. A rated output of the generator in the low rotation speed operation mode is substantially same as that of the normal operation mode as the rated displacement of the hydraulic pump is large in response to the low rotation speed of the main shaft 8. Therefore, in either one of the normal operation mode and the low rotation speed operation mode, the electric power obtained from the generator 20 is approximately the same in the rated operation.

The environmental conditions are such as if it is at a certain time, e.g. nighttime with noise regulations, if the wind turbine generator 1 is installed on a flyway of migrant birds and if a temperature of a shaft bearing for supporting the main shaft 8 is within an acceptable range.

Specifically, the operation mode selection unit 38 selects the low rotation speed operation mode in such a case that it is at the time such as the night time when the noise is restricted, the location of the wind turbine generator 1 is on the flyway of the migrant birds and it is in the season when the migrant birds migrate, or the temperature of the shaft bearing of the main shaft 8 is beyond the acceptable range.

Figure 3:
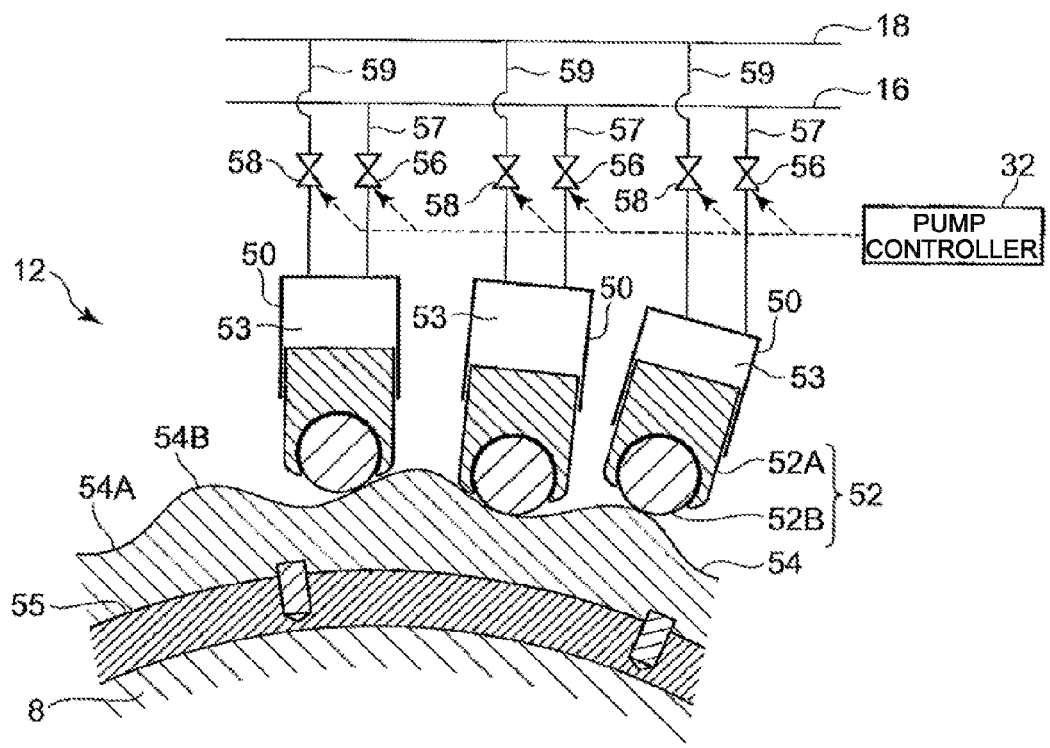
FIG. 3 is an illustration of a detailed structure of a hydraulic pump.
Figure 4:
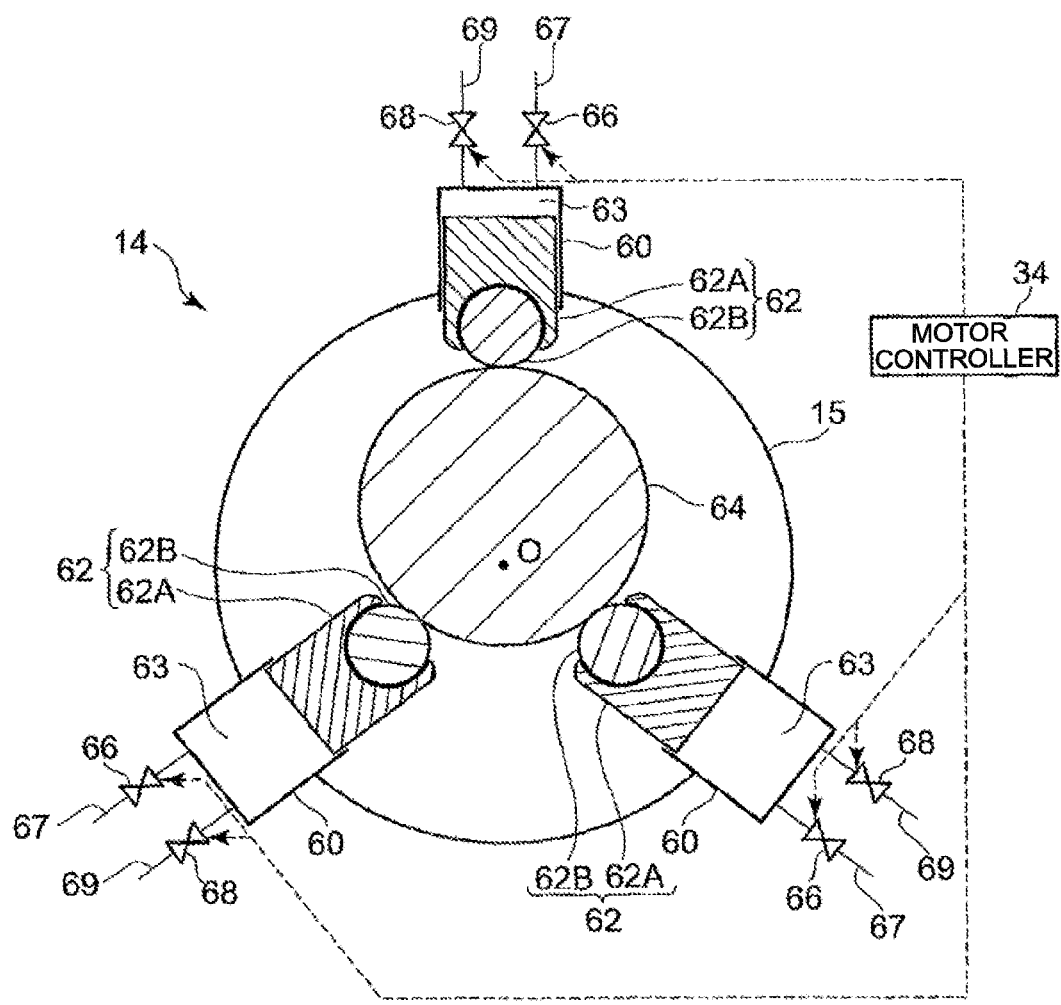
FIG. 4 is an illustration of a detailed structure of a hydraulic motor.

Now, a detailed structure of the hydraulic pump 12 and the hydraulic motor 14 of the wind turbine generator 1 is explained. FIG. 3 is an illustration of a detailed structure of a hydraulic pump 12. FIG. 4 is an illustration of a detailed structure of a hydraulic motor 14.

As shown in FIG. 3, The hydraulic pump 12 comprises a plurality of oil chambers 53 each of which is formed by a cylinder 50 and a piston 52, a cam 54 having a cam profile which is in engagement with the piston 52 and a high pressure valve 56 and a low pressure valve 58 which pare provided for each of the oil chambers 53.

From the perspective of operating the pistons 52 smoothly along the cam profile of the cam 54, each of the pistons 52 preferably comprises a piston body 52A which moves slidingly in the cylinder 50 and a piston roller or a piston shoe which is mounted on the piston body 52A and engages with the cam profile of the cam 54. FIG. 3 illustrates an example in which the piston 52 is constituted of the piston body 52A and the piston roller 52B.

The cam 54 is installed on an outer circumference of the main shaft 8 via a cam mount 55. For one rotation of the main shaft 8, the cam 54 moves each of the pistons 52 upward and downward many times, thereby increasing the torque 5. From this point of view, the cam 54 is preferably a ring cam that has a cam profile defining a plurality of waves with concave portions 54A and convex portions 54B that are alternately disposed around the main shaft.

The high pressure valve 56 is arranged in a high pressure communication path 57 between the high pressure oil line 16 and each of the oil chambers 53. Meanwhile, the low pressure valve 58 is arranged in a low pressure communication path 59 between the low pressure oil line 18 and each of the oil chambers 53. The pump controller 32 controls the opening/closing timing of the high pressure valve 56 and the low pressure valve 58.

For a disabled oil chamber of the oil chambers 53, that does not discharge high pressure oil to the high pressure oil line 16, the pump controller 32 keeps the high pressure valve 56 open and the low pressure valve closed during a cycle of the piston 52 starting from a bottom dead center, reaching a top dead center and returning to the bottom dead center. In contrast, for a working chamber of the oil chambers 53, that discharges the high pressure oil to the high pressure oil line, the pump controller opens the high pressure valve 56 and closes the low pressure valve 58 during a pump cycle of the piston 53 starting from the bottom dead center and reaching the top dead center, and closes the high pressure valve 56 and opens the low pressure valve during an intake cycle of the piston 52 starting from the top dead center and reaching the bottom dead center.

The pump controller 32 changes a ratio of disabled oil chambers to all of the oil chambers 53 so as to adjust the displacement $D_p$ of the hydraulic pump 12.

The example in which the pump controller 32 controls the opening and closing of both the high pressure valve 56 and the low pressure valve 58. However, the high pressure valve 56 may be constituted of a check valve to allow only the operating oil to the high pressure oil line 16. In that case, while the piston 52 of the hydraulic pump 12 is moving from the bottom dead center to the top dead center, the operating oil in the oil chamber 53 is compressed and the pressure in the oil chamber 53 becomes higher than the pressure in the high pressure oil line. Then, the high pressure valve automatically opens and thus, it is not necessary to actively control the high pressure valve 56.

As illustrated in FIG. 4, the hydraulic motor 14 comprises a plurality of hydraulic chambers 63 formed between cylinders 60 and pistons 62, a cam 64 having a cam profile which engages with the pistons 62, and the high pressure valve 66 and the low pressure valve 68 that are provided for each of the hydraulic chambers 63.

From the perspective of converting the upward and downward motion of the pistons 62 smoothly to the rotary motion of the cam 64, each of the pistons 62 preferably comprises a piston body 62A which moves slidingly in the cylinder 60 and a piston roller or a piston shoe which is mounted on the piston body 62A and engages with the cam profile of the cam 64. FIG. 4 illustrates the example in which each of the pistons 62 is constituted of the piston body 62A and the piston roller 62B.

The cam 64 is an eccentric cam that is disposed eccentrically with respect to a shaft center O of the output shaft (crank shaft) 15 of the hydraulic motor 14 connected to the generator 20. While the pistons 62 complete one set of upward and downward motions, the cam 64 and the output shaft 15 on which the cam 44 is mounted, complete one rotation.

As described above, the cam 54 of the hydraulic pump 12 is the ring cam and the cam 64 of the hydraulic motor 14 is the eccentric cam so that the displacement of the hydraulic motor 14 is smaller than that of the hydraulic pump 12 to achieve a high speed increasing ratio of the hydraulic transmission 10.

The high pressure valve 66 is arranged in a high pressure communication path 67 between the high pressure oil line 16 and each of the oil chambers 63. The low pressure valve 68 is arranged in a low pressure communication path 69 between the low pressure oil line 18 and each of the oil chambers 63. The motor controller 34 controls the opening/closing timing of the high pressure valve 66 and the low pressure valve 68.

For a disabled oil chamber of the oil chambers 63, to which the high pressure oil is not fed from the high pressure oil line 16, the motor controller 34 keeps the high pressure valve 66 closed and the low pressure valve 68 open during a cycle of the piston 62 starting from a bottom dead center, reaching a top dead center and returning to the bottom dead center. In contrast, for a working chamber of the oil chambers 63, to which the high pressure oil is fed from the high pressure oil line 16, the motor controller opens the high pressure valve 66 and closes the low pressure valve 68 during a motor cycle of the piston 62 starting from the top dead center and reaching the bottom dead center, and closes the high pressure valve 66 and opens the low pressure valve 68 during a discharge cycle of the piston 62 starting from the bottom dead center and reaching the top dead center.

The motor controller 34 changes a ratio of disabled oil chambers to all of the oil chambers 63 so as to adjust the displacement $D_m$ of the hydraulic motor 14.

Figure 5:
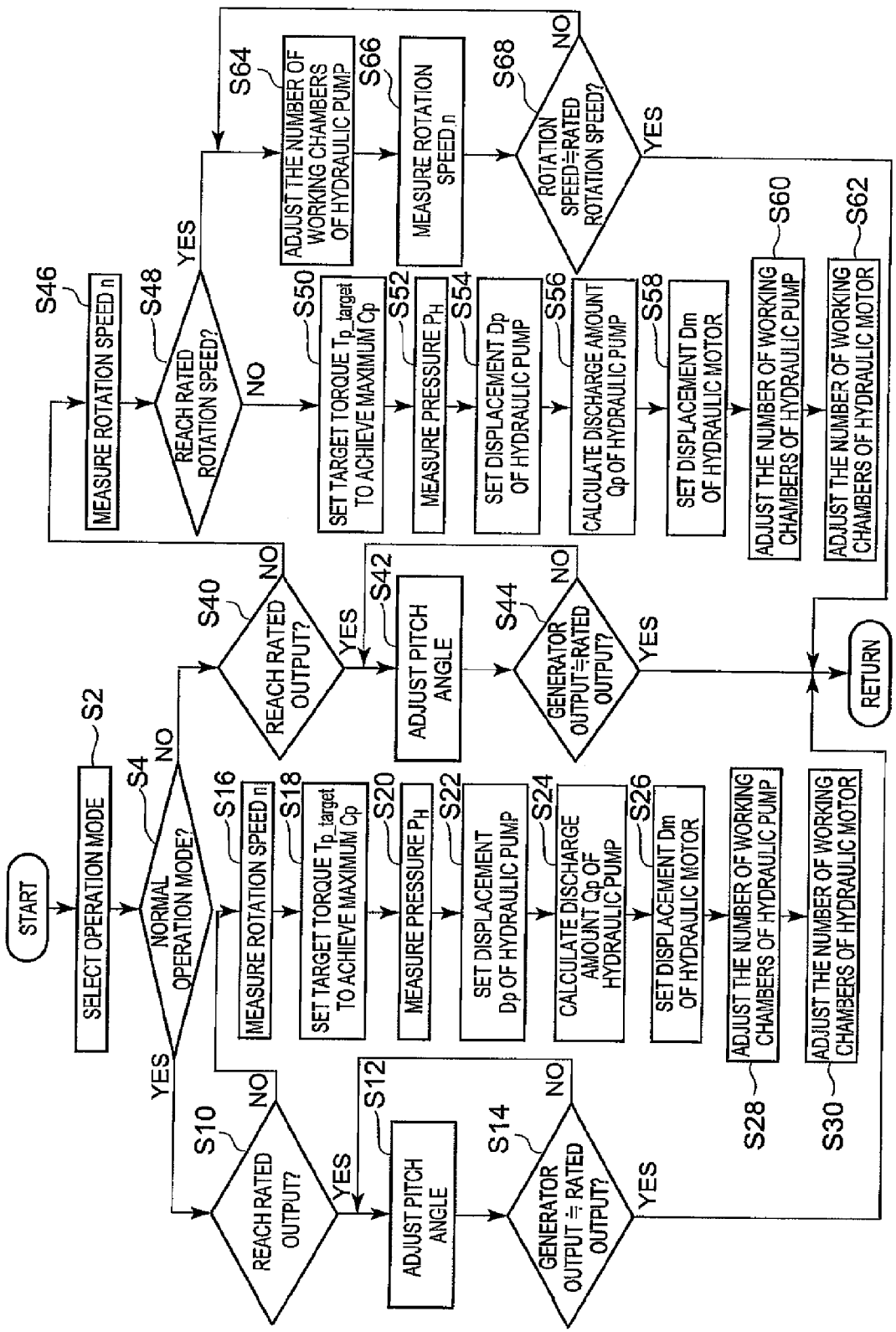
FIG. 5 is a flow chart of an operation control method for the wind turbine generator.

Next, an operation control method of the wind turbine generator 1 by the control unit 30 is explained. FIG. 5 is a flow chart of the operation control method of the wind turbine generator 1.

As shown in FIG. 5, in a step S2, the operation mode selection unit 38 selects one of the normal operation mode and the low rotation speed operation mode depending on the environmental conditions. For example, the operation mode selection unit 38 selects the low rotation speed operation mode in such a case that it is at the time such as the night time when the noise is restricted, the location of the wind turbine generator 1 is on the flyway of the migrant birds and it is in the season when the migrant birds migrate, or the temperature of the shaft bearing of the main shaft 8 is beyond the acceptable range and selects the normal operation mode in other cases.

In a step S4, it is determined if the normal operation mode is selected. If it is determined that the normal operation mode is selected, a normal operation control is performed in steps S10 to S30. In contrast, if it is determined that the low rotation speed operation mode is selected, a low rotation speed operation control is performed in steps S40 to S68.

(Normal Operating Control)

For the normal operation control, in a step S10 it is determined if the output of the generator 20 has reached the rated output. If it is determined that the output of the generator 20 has reached the rated output, in a step S12, the pitch controller 36 controls the servo valve 44 of the pitch driving mechanism 40 to adjust the pitch angle of the blade 4 so that the output of the generator 20 reaches the rated output. Then in a step S14 it is determined if a difference between the output of the generator 20 and the rated output is within an allowable range. If the difference is not within the allowable range, the process returns to the step S12 to readjust the pitch angle of the blade 4.

In contrast, if it is determined in the step S10 that the output of the generator 20 has not reached the rated output (NO in the step S10), the process advances to a step S16. In the step S16, the rotation speed meter 26 measures the rotation speed n of the main shaft 8. In a step S18, based on the rotation speed n, the pump controller sets a target torque $T_{p\_target}$ of the hydraulic pump 12 at which a power coefficient becomes maximum. For example, with use of a table in which the relationship between the rotation speed of the main shaft 8 and the target torque of the hydraulic pump 12 is set in advance, it is possible to obtain the target torque $T_{p\_target}$ of the hydraulic pump 12 that corresponds to the rotation speed n of the main shaft measured by the rotation speed meter 26.

Further, in a step S20 a pressure sensor 28 measures the pressure $P_H$ in the high pressure oil line 16.

In a step S22, based on the target torque $T_{p\_target}$ of the hydraulic pump 12 and the pressure $P_H$ in the high pressure oil line 16, the pump controller 32 sets the displacement $D_p$ of the hydraulic pump 12 according to a Math. 1 below.

$$\text{Displacement } D_p = \text{Target torque } T_{p\_target}/\text{Pressure } P_H \quad [\text{Math. 1}]$$

After the displacement $D_p$ of the hydraulic pump 12 is set in the step S22, the process advances to a step S24. In the step S24 the pump controller 32 sets a discharge amount $Q_p$ of the hydraulic pump 12 based on the displacement $D_p$ according to a Math. 2 below.

$$\text{Discharge mount } Q_p = \text{Displacement } D_p \times \text{Rotation speed } n \quad [\text{Math. 2}]$$

Next, in a step S26 the motor controller 34 sets a displacement $D_m$ of the hydraulic motor 14 so that the rotation speed of the generator 20 is kept constant. Specifically, the motor controller 34 sets the displacement $D_m$ of the hydraulic motor 14 according to a Math. 3 so that the rotation speed of the generator 20 becomes a prescribed value, e.g. 1500 rpm or 1800 rpm.

$$\text{Displacement } D_m = \text{Discharge amount } Q_p/\text{Rotation speed } n_g \text{ of generator} \quad [\text{Math. 3}]$$

Next, in a step S28, the pump controller 32 changes the number of working chambers of the hydraulic pump 12 so that the displacement of the hydraulic pump 12 becomes $D_p$ according to a Math. 4 below.

$$\text{Displacement } D_p = m \times V_p \times F_{dp} \quad [\text{Math. 4}]$$

m is the number of concave portions and convex portions of the cam 54. $V_p$ is the total capacity of all of the cylinders 50. $F_{dp}$ is a ratio of working chambers to all of the oil chambers 53.

In a similar manner, in a step S30, the motor controller 34 changes the number of working chambers of the hydraulic motor 14 so that the displacement of the hydraulic motor 14 becomes $D_m$ according to a Math. 5 below.

$$\text{Displacement } D_m = V_m \times F_{dm} \quad [\text{Math. 5}]$$

$V_m$ is the total capacity of all of the cylinders 60 and $F_{dm}$ is the ratio of the working chambers to all of the oil chambers 63.

As described above, in the steps S18, S22 and S28 of the normal operation mode, the pump controller 32 obtains the target torque $T_{p\_target}$ of the hydraulic pump 12 at which the power coefficient becomes maximum, sets the displacement Dp of the hydraulic pump 12 based on the target torque $T_{p\_target}$ and the pressure PH in the high pressure oil line 16, and controls the hydraulic pump 12. As a result, the power generation efficiency is improved.

Moreover, in the steps S26 and S30 of the normal operation mode, the motor controller 34 sets the displacement $D_m$ of the hydraulic motor 14 based on the discharge mount $Q_p$ of the hydraulic pump 12 so that the rotation speed of the generator 20 becomes constant and controls the hydraulic pump 14. As a result, the rotation speed of the generator can be kept constant even when the target torque $T_{p\_target}$ of the hydraulic pump 12 changes. Thus, the electric power having constant frequency can be produced in the generator 20.

(Low Rotation Speed Operation Control)

In the low rotation speed operation control, in a step S40, it is determined if the output of the generator 20 has reached a rated output. If the output of the generator 20 has reached the rated output, in a step S42 the pitch controller 36 controls the servo valve 44 of the pitch driving mechanism 40 to change the pitch angle of the blade 4 so that the output of the generator 20 reaches the rated output. And in a step S44 it is determined if a difference between the output of the generator 20 and the rated output is within an allowable range. If the difference is not in the allowable range, the process returns to the step S42 to readjust the pitch angle of the blade 4.

In contrast, if the output of the generator 20 has not reached the rated output (determined as NO in the step S40), in a step S46 the rotation speed meter 26 measures the rotation speed n of the main shaft 8. In a step S48 it is determined if the rotation speed n of the main shaft 8 has reached a rated rotation speed n2 (<n1). Herein, n1 is a rated rotation speed of the main shaft in the normal operation mode and n2 is a rated rotation speed of the main shaft 8 in the low rotation speed operation mode.

If it is determined in the step S48 that the rotation speed n of the main shaft 8 is not greater than the rated rotation speed n2, the process advances to a step S50. In the step S50, based on the rotation speed n of the main shaft 8 measured in the step S46, the pump controller 32 sets a target torque $T_{p\_target}$ of the hydraulic pump 12 at which the power coefficient becomes maximum.

Next, in steps S52 to S62 the pump controller 32 sets the displacement Dp of the hydraulic pump 12 based on the target torque $T_{p\_target}$ and the pressure PH in the high pressure oil line, controls the hydraulic pump 12 and the motor controller 34 sets the displacement Dm of the hydraulic motor 14 based on the discharge mount Qp of the hydraulic pump so that the oration speed of the generator 20 becomes constant, and controls the hydraulic motor 14. The steps S52 to S62 are similar to the steps S20 to S30 of the normal operation control and thus, will not be explained further.

If it is determined in the step S48 that the rotation speed of the main shaft 8 has reached the rated rotation speed n2 (exceed the rated rotation speed n2), the process advances to a step S64. In the step S64 the pump controller 32 adjust the number of working chambers of the hydraulic pump so that the rotation speed n of the main shaft reaches the rated rotation speed n2. Specifically, the number of working chambers of the hydraulic pump 12 is increased so as to increase the torque required for driving the hydraulic pump 12 and reduce the rotation speed n of the main shaft 8 to the rated rotation speed n2.

Next, in a step S66 the rotation speed meter 26 measures again the rotation speed n of the main shaft 8 and in a step S68 it is determines if the difference between the rotation speed n of the main shaft 8 and the rated rotation speed n2 is within the allowable range. If it is determined that the difference between the rotation speed n of the main shaft 8 and the rated rotation speed n2 is not within the allowable range, the process returns to the step S64 to readjust the number of working chambers of the hydraulic pump 12 by the pump controller 32.

As described above, in the steps S50, S54 and S60 of the low rotation speed operation mode in the manner similar to the normal operation mode, if the rotation speed n of the main shaft 8 is not greater than the rated rotation speed n2, the pump controller 32 obtains the target torque $T_{p\_target}$ of the hydraulic pump 12 at which the power coefficient becomes maximum, sets the displacement $D_p$ of the hydraulic pump 12 based on the target torque $T_{p\_target}$ and the pressure $P_H$ in the high pressure oil line 16, and controls the hydraulic pump 12. As a result, the power generation efficiency is improved.

Moreover, in the steps S58 and S62, the motor controller 34 sets the displacement $D_m$ of the hydraulic motor 14 based on the discharge mount $Q_p$ of the hydraulic pump 12 so that the rotation speed of the generator 20 becomes constant and controls the hydraulic pump 14. As a result, the rotation speed of the generator can be kept constant even when the target torque $T_{p\_target}$ of the hydraulic pump 12 changes.

Further, in the low rotation speed operation mode, in such a case that the rotation speed n of the main shaft 8 exceeds the rated rotation speed n2, the number of working chambers of the hydraulic pump 12 is increased in the step S64 so as to keep the rotation speed of the main shaft 8 at the rated rotation speed n2 which is lower than the rated rotation speed n1 of the main shaft in the normal operation mode.

Preferred Embodiment

The simulation on the above operation control method was run. The calculation conditions are that the rotation speed n1 of the main shaft in the normal operation mode is 12 rpm (the tip circumferential speed of the blade 4 is 79 m/s), the rated rotation speed n2 of the main shaft in the low rotation speed operation mode is 10.5 rpm (the tip circumferential speed is 69 m/s), the rated output of the generator 20 is 3.5 MW and the cut-in wind speed is 3.5 m/s.

Figure 6:
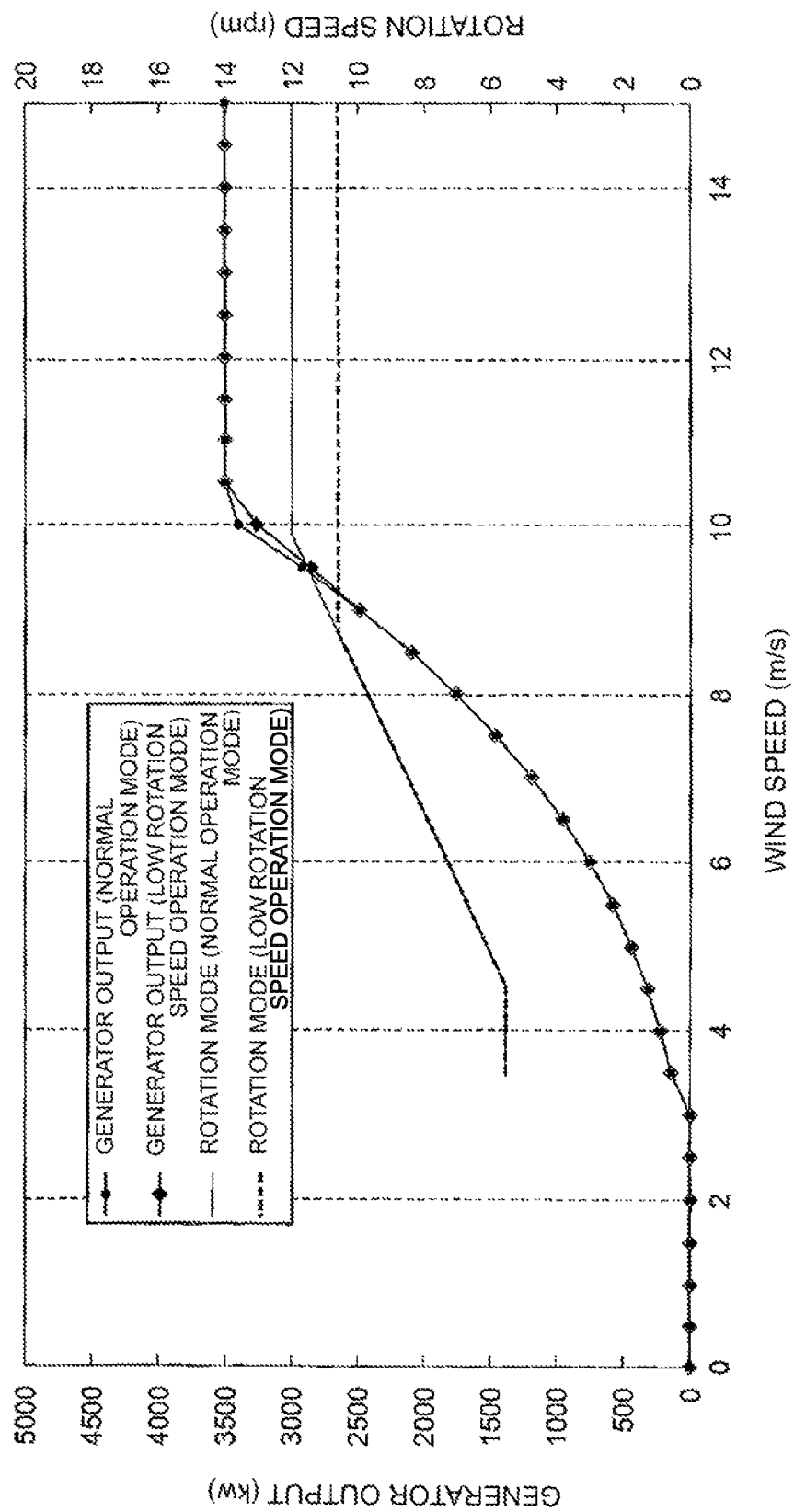
FIG. 6 is a graph showing a result of comparing a normal operation mode and a low rotation speed operation mode in relation to a generator output and a rotation speed of a main shaft.

FIG. 6 is a graph showing a result of comparing the normal operation mode and the low rotation speed operation mode which relate to the output of the generator 20 and the rotation speed of a main shaft 8. FIG. 7 is a graph showing a result of comparing the normal operation mode and the low rotation speed operation mode in relation to the output of the generator 20 and the power coefficient $C_p$.

As illustrated in FIG. 6, when the wind speed is not higher than approximately 8.7 m/s, there is not much difference between the normal operation mode and the low rotation speed operation mode. In both of the operation modes, the control of the hydraulic transmission 10 so that the power coefficient Cp is maximum and the rotation speed of the generator 20 is constant. Therefore, in both of the operation modes, the output of the generator 20 increases as the wind speed increases, and the rotation speed of the main shaft 8 increases as the wind speed increases.

However, when the wind speed reaches near 8.7 m/s, the rotation speed of the main shaft 8 reaches the rated rotation speed n2 (10.5 rpm) of the main shaft 8 in the low rotation speed operation mode. Beyond this point, there occurs a slight difference in the output of the generator 20 between the normal operation mode and the low rotation speed operation mode. This is because, in the normal operation mode the control of the hydraulic transmission 10 is performed so that the power coefficient Cp is maximum and the rotation speed of the generator 20 is constant, while in the low rotation speed operation mode the control is performed to increase the torque of the hydraulic pump 12 so that the rotation speed of the main shaft 8 is kept constant (S64 to S68 of FIG. 5).

When the wind speed reaches near 10.5 m/s, in both of the operation modes the output of the generator 20 reaches the rated output (3.5 MW). Thus, in both of the normal operation mode and the low rotation speed operation mode, the pitch angle of the blade 4 is adjusted to maintain the output of the generator at the rated output (S12 to S14 and S42 to S44). Therefore, in both of the operation modes the output of the generator 20 becomes the rated output.

As illustrated in FIG. 7, once the wind speed reaches the cut-in wind speed (3.5 m/s), the power coefficient Cp increases dramatically and becomes maximum in both of the operation modes. This lasts until the wind speed becomes approximately 8.7 m/s, at which the rotation speed of the main shaft 8 in the low rotation speed operation mode reaches the rated rotation speed n2 (10.5 rpm).

When the wind speed is near 8.5 m/s, a slight difference of the power coefficient in the operation modes takes place. This is because, in the normal operation mode the control of the hydraulic transmission 10 is performed so that the power coefficient Cp is maximum and the rotation speed of the generator 20 is constant (S16 to S30 of FIG. 5), while in the low rotation speed operation mode the control is performed to increase the torque of the hydraulic pump 12 so that the rotation speed of the main shaft 8 is kept constant (S64 to S68 of FIG. 5).

When the wind speed reaches near 10.5 m/s, in both of the operation modes the output of the generator 20 reaches the rated output (3.5 MW). Thus, in both of the normal operation mode and the low rotation speed operation mode, the pitch angle of the blade 4 is adjusted to maintain the output of the generator at the rated output (S12 to S14 and S42 to S44 of FIG. 5) and the wind is allowed to escape partially and thus the power coefficient Cp decreases.

According to the operation control method described above, the operation mode can be selected between the normal operation mode and the low rotation speed operation mode. Although there is minor decline of the output of the generator and decline of the power coefficient Cp when the wind speed is approximately between 8.7 m/s and 10.5 m/s, it is possible to reduce the rated rotation speed from 12 rpm (tip circumferential speed 79 m/s) to 10.5 rpm (tip circumferential speed 69 m/s) without losing the power generation efficiency in almost all wind speed areas.

As explained above, in the preferred embodiment, the operation mode selection unit 38 selects the normal operation mode or the low rotation speed operation mode with lower rated rotation speed of the main shaft, depending on environment conditions. The low rotation speed operation mode can be selected when there is a need to take measures against issues such as the noise, bird strikes, the friction heat of the shaft bearing.

The low rotation speed operation mode has a rated rotation speed of the main shaft 8 lower than that of the normal operation mode and a rated displacement of the hydraulic pump 12 greater than that of the normal operation mode. Thus, the low rotation speed operation mode can achieve a rated output of the generator 20 substantially same as that of the normal operation mode. Therefore, by adopting the low rotation speed operation mode, the rated rotation speed of the main shaft 8 can be reduced without experiencing the lower rated output of the generator 20.

While the present invention has been described with reference to exemplary embodiments, it is obvious to those skilled in the art that various changes may be made without departing from the scope of the invention.

In some embodiments the rated torque of the pump 12 (due to the rated pressure of the hydraulic oil line or the rated displacement of the pump) is similar in the low rotation speed operation mode as in the normal operation mode. In these embodiments the pitch angle of the blade 4 is adjusted to progressively reduce the torque $T_{p\_target}$ and the power coefficient Cp above the rated speed of the low rotation speed operation mode (i.e. below the rated speed of the normal operation mode above which it is reduced anyway). Thus in some embodiments the rated power of the wind turbine may be reduced in the low rotation speed operation mode, compared to the normal operation mode.

In the above embodiment, the rotation speed meter 26 measures the rotation speed n of the main shaft and based on the rotation speed n of the main shaft 8, the target torque of the hydraulic pump is obtained. However, it is also possible to obtain the target torque of the hydraulic pump 12 based on the wind speed V measured by the anemometer. In that case, one anemometer may be provided for each of the wind turbine generator or one anemometer can be used for a plurality of the wind turbine generators 1. And the anemometer may be mounted on the nacelle 22.

Further, in the above preferred embodiment, the ratio of the disabled chambers to all of the oil chambers (53, 63) is changed to adjust the displacements of the hydraulic pump 12 and the hydraulic motor 14. But it is also possible to change the displacements of the hydraulic pump 12 and the hydraulic motor 14 by changing the timing of opening the high pressure valve (56, 66) during the piston cycle.

Furthermore, the preferred embodiment shows the exemplary case wherein the displacement of the low rotation speed operation mode is set greater than that of the normal operation mode. But there is no restriction as long as the low rotation speed operation mode has a rated rotation speed of the main shaft 8 lower than that of the normal operation mode and a rated output of the generator 20 substantially same as that of the normal operation mode.

For instance, in the low rotation speed operation mode, the rated pressure of the high pressure oil line can be set higher for the lower rated rotation speed of the main shaft 8 in comparison to the normal operation mode (the rated pressure of the high pressure oil line is set higher in reverse proportion to the lower rated rotation speed of the main shaft 8) so as to obtain the same rated output of the generator as that of the normal operation mode. Alternatively, for the lower rated rotation speed of the main shaft 8, both of the rated displacement of the hydraulic pump 12 and the rated pressure of the high pressure oil line 16 may be set higher in the low rotation speed operation mode that those of the normal operation mode

REFERENCE SIGNS LIST

1 wind turbine generator
2 rotor
4 blade
6 hub
8 main shaft
10 hydraulic transmission
12 hydraulic pump
14 hydraulic motor
15 output shaft
16 high pressure oil line
18 low pressure oil line
20 generator
22 nacelle
24 tower
26 rotation speed meter
28 pressure sensor
30 control unit
32 pump controller
34 motor controller
36 pitch controller
38 driving mode selection unit
40 pitch driving mechanism
42 hydraulic cylinder
44 servo valve
46 oil pressure source
48 accumulator
50 cylinder
52 piston
52A piston body
52B piston roller
53 oil chamber
54 cam
56 high pressure valve
57 high pressure communication path
58 low pressure valve
59 low pressure communication path
60 cylinder
62 piston
62A piston body
62B piston roller
62 oil chamber
64 cam
66 high pressure valve
67 high pressure communication path
68 low pressure valve
69 low pressure communication path

The invention claimed is:

1. A wind turbine generator comprising:
   a hub;
   a main shaft coupled to the hub;
   a generator which is configured to convert rotation energy transmitted from the main shaft to electric power;
   a hydraulic pump of variable displacement type which is rotatable by the main shaft;
   a hydraulic motor of variable displacement type which is connected to the generator;
   a high pressure oil line which is arranged between a discharge side of the hydraulic pump and an intake side of the hydraulic motor;
   a low pressure oil line which is arranged between an intake side of the hydraulic pump and a discharge side of the hydraulic motor;
   a control unit which has a pump controller and a motor controller, the pump controller adjusting a displacement $D_p$ of the hydraulic pump, the motor controller adjusting a displacement $D_m$ of the hydraulic motor; and
   an operation mode selection unit which is configured to switch an operation mode between a normal operation mode and a low rotation speed operation mode,
   wherein
   the control unit is configured to control the pump controller and the motor controller such that a rotation speed of the main shaft is variable depending on a wind speed when the normal operation mode is selected by the operation mode selection unit and the wind speed falls within a range more than a cut-in wind speed and less than a first rated wind speed,
   the control unit is configured to control the pump controller and the motor controller such that the rotation speed of the main shaft is set constant at a first rated rotation speed when the normal operation mode is selected by the operation mode selection unit and the wind speed is equal to or more than the first rated wind speed,
   the control unit is configured to control the pump controller and the motor controller such that the rotation speed of the main shaft is variable depending on the wind speed when the low rotation speed operation mode is selected by the operation mode selection unit and the wind speed falls within a range more than the cut-in wind speed and less than a second rated wind speed, the control unit is configured to control the pump controller and the motor controller such that the rotation speed of the main shaft is set constant at a second rated rotation speed when the low rotation speed operation mode is selected by the operation mode selection unit and the wind speed is equal to or more than the second rated wind speed, and the second rated rotation speed is lower than the first rated rotation speed.

2. The wind turbine generator according to claim 1, wherein, in the low rotation speed operation mode, at least one of a rated displacement of the hydraulic pump and a rated pressure of the high pressure oil line are greater than that of the normal operation mode.

3. The wind turbine generator according to claim 1, wherein the rated output of electric power in the low rotation speed operation mode is substantially the same as that of the normal operation mode.

4. The wind turbine generator according to claim 1, further comprising:
a pitch driving mechanism which is configured to adjust a pitch angle of blades mounted on the hub, and
wherein the control unit is configured to the pitch driving mechanism so as to maintain rated output of the generator once the output of the generator reaches the rated output.

5. The wind turbine generator according to claim 1, further comprising
a rotation speed sensor which is configured to measure a rotation speed of the main shaft, wherein the control unit is configured to increase a torque required for driving the hydraulic pump so as to decrease the rotation speed of the main shaft when the low rotation speed operation mode is selected and the rotation speed of the main shaft exceeds the second rated rotation speed.

6. The wind turbine generator according to claim 1, wherein, for both of the normal operation mode and the low rotation speed operation mode, when the rotation speed of the main shaft is not more than the second rated rotation speed of the low rotation speed operation mode, the pump controller is configured to obtain a target torque of the hydraulic pump at which a power coefficient becomes maximum, and then set the displacement $D_p$ of the hydraulic pump based on the target torque and a hydraulic pressure of operating oil in the high pressure oil line.

7. The wind turbine generator according to claim 6, further comprising:
a rotation speed sensor which measures a rotation speed of the main shaft,
wherein the pump controller is configured to obtain the target torque at which a power coefficient becomes maximum in accordance with the rotation speed of the main shaft measured by the rotation speed sensor.

8. The wind turbine generator according to claim 6, further comprising:
an anemometer which measures a wind speed,
wherein the pump controller is configured to obtain from the measured wind speed the target torque at which a power coefficient becomes maximum.

9. The wind turbine generator according to claim 6, wherein the motor controller is configured to set the displacement $D_m$ of the hydraulic motor based on a discharge amount $Q_p$ of the hydraulic pump so that a rotation speed of the generator becomes constant, the discharge amount $Q_p$ of the hydraulic pump being obtained from the displacement $D_p$.

10. The wind turbine generator according to claim 1, wherein the operation mode selection unit is configured to select the normal operation mode or the low rotation speed operation mode depending on environment conditions.

11. The wind turbine generator according to claim 10, wherein the environment conditions comprise at least one of sound, bird strikes or temperature of a bearing supporting the main shaft.

12. A wind turbine generator comprising:
a hub;
a main shaft coupled to the hub;
a generator which is configured to convert rotation energy transmitted from the main shaft to electric power;
a hydraulic pump of variable displacement type which is rotatable by the main shaft;
a hydraulic motor of variable displacement type which is connected to the generator;
a high pressure oil line which is arranged between a discharge side of the hydraulic pump and an intake side of the hydraulic motor;
a low pressure oil line which is arranged between an intake side of the hydraulic pump and a discharge side of the hydraulic motor;
a control unit which has a pump controller and a motor controller, the pump controller adjusting a displacement $D_p$ of the hydraulic pump, the motor controller adjusting a displacement $D_m$ of the hydraulic motor; and
an operation mode selection unit which is configured to switch an operation mode between a normal operation mode and a low rotation speed operation mode, the low rotation speed operation mode having a rated rotation speed of the main shaft lower than that of the normal operation mode,
wherein, for both of the normal operation mode and the low rotation speed operation mode, when the rotation speed of the main shaft is not more than the second rated rotation speed of the low rotation speed operation mode, the pump controller is configured to obtain a target torque of the hydraulic pump at which a power coefficient becomes maximum, and then set the displacement $D_p$ of the hydraulic pump based on the target torque and a hydraulic pressure of operating oil in the high pressure oil line,
wherein the motor controller is configured to set displacement $D_m$ of the hydraulic motor based on a discharge amount $Q_p$ of the hydraulic pump so that a rotation speed of the generator becomes constant, the discharge amount $Q_p$ of the hydraulic pump being obtained from the displacement $D_p$,
wherein each of the hydraulic pump and the hydraulic motor includes a plurality of oil chambers each of which is surrounded by a cylinder and a piston moving slidingly in the cylinder, a cam having a cam profile which is in engagement with the piston, high pressure valves each of which is adapted to open and close a communication path between each of the oil chambers and the high pressure oil line, and low pressure valves each of which is adapted to open and close a communication path between each of the oil chambers and the low pressure oil line,
wherein the pump controller is configured to adjust the displacement $D_p$ of the hydraulic pump by a ratio of disabled oil chambers to all of the oil chambers of the hydraulic pump, the disabled oil chambers being kept such that during a cycle of the piston of the hydraulic pump starting from a bottom dead center, reaching a top dead center and returning to the bottom dead center, the high pressure valve of the hydraulic pump is closed and the low pressure valve remains open, and wherein the motor controller is configured to adjust the displacement $D_m$ of the hydraulic motor by a ratio of disabled oil chambers to all of the oil chambers of the hydraulic motor so as to adjust, the disabled oil chambers being kept such that during a cycle of the piston of the hydraulic pump starting from a bottom dead center, reaching a top dead center and returning to the bottom dead center, the high pressure valve of the hydraulic pump is closed and the low pressure valve remains open.

13. The wind turbine generator according to claim 12, wherein the cam of the hydraulic pump is a ring cam which is disposed circumferentially around the main shaft and has a cam profile defining a plurality of waves with a plurality of concave portions and convex portions that are alternately disposed around the main shaft, and wherein the cam of the hydraulic motor is an eccentric cam.

14. A method for operation a wind turbine generator which comprises a hub, a main shaft connected to the hub, a generator for converting a rotation energy transmitted from the main shaft to electric power, a hydraulic pump which is rotated by the main shaft, a hydraulic motor of variable displacement type connected to the generator, a high pressure oil line arranged between a discharge side of the hydraulic pump and an intake side of the hydraulic motor, a low pressure oil line arranged between an intake side of the hydraulic pump and a discharge side of the hydraulic motor, the method comprising:

a mode selection step of selecting an operation mode between a normal operation mode and a low rotation speed operation mode depending on environmental conditions; and a displacement adjustment step of adjusting the displacements of the hydraulic pump and the hydraulic motor based on the operation mode selected in the mode selection step, wherein the pump controller and the motor controller are controlled at the displacement adjustment step such that a rotation speed of the main shaft is variable depending on the wind speed when the normal operation mode is selected at the mode selection step and the wind speed falls within a range more than a cut-in wind speed and less than a first rated wind speed, the pump controller and motor controller are controlled at the displacement adjustment step such that the rotation speed of the main shaft is set constant at a first rated rotation speed when the normal operation mode is selected at the mode selection step and the wind speed is equal to or more than the first rated wind speed, the pump controller and motor controller are controlled at the displacement adjustment step such that the rotation speed of the main shaft is variable depending on the wind speed when the low rotation speed operation mode is selected at the mode selection step and the wind speed falls within a range more than the cut-in wind speed and less than a second rated wind speed, the pump controller and motor controller are controlled at the displacement adjustment step such that the rotation speed of the main shaft is set constant at a second rated rotation speed when the low rotation speed operation mode is selected at the mode selection step and the wind speed is equal to or more than the second rated wind speed, and the second rated rotation speed is lower than the first rated rotation speed.

15. The method according to claim 14, wherein at least one of a rated displacement of the hydraulic pump and a rated pressure of the high pressure oil line are greater in the low rotation speed operation mode than that of the normal operation mode.

16. The method according to claim 14, wherein a rated output of electric power in the low rotation speed operation mode is substantially the same as that of the normal operation mode.

17. The method according to claim 14, wherein a torque required for driving the hydraulic pump is increased at the displacement adjustment step so as to decrease the rotation speed of the main shaft when the low rotation speed operation mode is selected at the mode selection step and the rotation speed of the main shaft exceeds the second rated rotation speed.

18. The method according to claim 14, wherein each of the hydraulic pump and the hydraulic motor includes a plurality of oil chambers each of which is surrounded by a cylinder and a piston moving slidingly in the cylinder, a cam having a cam profile which is in engagement with the piston, high pressure valves each of which opens and closes a communication path between each of the oil chambers and the high pressure oil line, and low pressure valves each of which opens and closes a communication path between each of the oil chambers and the low pressure oil line, and the displacement adjustment step includes the steps of:

obtaining a target torque of the hydraulic pump at which a power coefficient becomes maximum for both of the normal operation mode and the low rotation speed operation mode when the rotation speed of the main shaft is not more than the second rated rotation speed of the low rotation speed operation mode;

setting the displacement $D_p$ of the hydraulic pump based on the target torque and a hydraulic pressure of operating oil in the high pressure oil line;

setting the displacement $D_m$ of the hydraulic motor based on a discharge amount $Q_p$ of the hydraulic pump so that a rotation speed of the generator becomes constant, the discharge amount $Q_p$ of the hydraulic pump being obtained from the displacement $D_p$;

adjusting the displacement $D_p$ of the hydraulic pump by a ratio of disabled oil chambers to all of the oil chambers of the hydraulic pump, the disabled oil chambers being kept such that during a cycle of the piston of the hydraulic pump starting from a bottom dead center, reaching a top dead center and returning to the bottom dead center, the high pressure valve of the hydraulic pump is closed and the low pressure valve remains open; and adjusting the displacement $D_m$ of the hydraulic motor by a ratio of disabled oil chambers to all of the oil chambers of the hydraulic motor so as to adjust, the disabled oil chambers being kept such that during a cycle of the piston of the hydraulic pump starting from a bottom dead center, reaching a top dead center and returning to the bottom dead center, the high pressure valve of the hydraulic pump is closed and the low pressure valve remains open.

19. The method according to claim 14, wherein, in the mode selection step, the normal operation mode or the low rotation speed operation mode is selected depending on environment conditions.

20. The method according to claim 19, wherein the environment conditions comprises at least one of sound, bird strikes or temperature of a bearing supporting the main shaft.

* * * * *